Aug. 30, 1966   F. O. SWANSON   3,269,865
BATTERY ELEMENTS ANCHORED WITH URETHANE FOAM
Filed May 20, 1963

FRANK O. SWANSON
INVENTOR

John R. Faulkner
BY Thomas H. Oster
ATTORNEYS

United States Patent Office 3,269,865
Patented August 30, 1966

3,269,865
BATTERY ELEMENTS ANCHORED WITH URETHANE FOAM
Frank O. Swanson, Toledo, Ohio, assignor to Ford Motor Company, Dearborn, Mich., a corporation of Delaware
Filed May 20, 1963, Ser. No. 281,413
7 Claims. (Cl. 136—80)

This invention relates to a lead acid type of storage battery and to a method of producing such a storage battery. This invention is especially concerned with a method of securing the battery elements to the case in a manner which will substantially enhance the ability of the battery to resist the damaging effects of the vibration encountered in motor vehicle service.

This invention is best understood by reference to the three figures of drawing in which.

Figure 1:
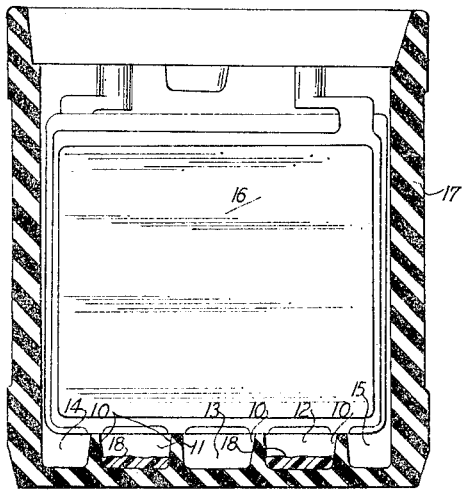
FIGURE 1 is a cross section of a storage battery showing the battery as it is being assembled.

FIGURE 1 shows a battery in the course of construction. Battery element 16 has been placed in case 17. The bottom of case 17 is provided with longitudinal ribs 10 dividing the space below battery element 16 into spaces 11, 12, 13, 14 and 15. A shallow layer 18 of a liquid resin is placed in spaces 11 and 12. The preferred resin for this service is the polyurethane type which is capable of spontaneous evolution of gas and expansion into a porous foamed material. Any resin liquid capable of this type of foaming action and which is inert to the action of sulphuric acid may be used in place of the polyurethane which is cited by way of example only.

After the liquid resin layer 18 and battery element 16 have been placed in position, a spontaneous evolution of gas from the resin layer takes place. This evolution of gas converts the resin layer into a porous foamed mass which entirely fills spaces 11 and 12 and tightly secures the lower portion of battery element 16 to case 17. The battery elements 16 when so secured are much more resistant to damage from vibration than are the ordinary unsecured battery elements.

Figure 2:
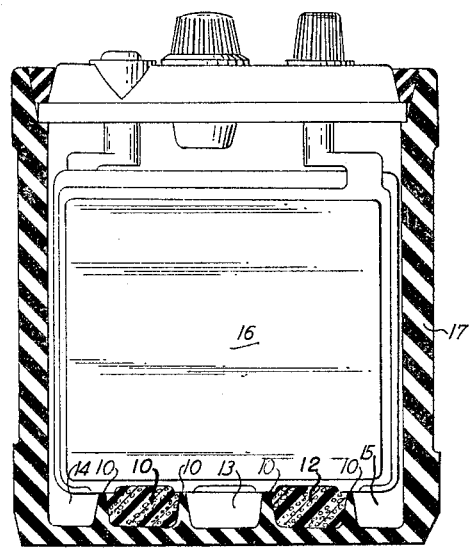
FIGURE 2 is a similar cross section of a storage battery which has been completed; and, FIGURE 3 is a partial cross section of a storage battery depicting a variation of the structure shown in FIGURE 2.

FIGURE 2 is a showing of the completed battery. Note that spaces 11 and 12 are completely filled with the foamed resin. The upper portion of this foamed resin is firmly in contact with the bottom of the battery element 16.

Figure 3:
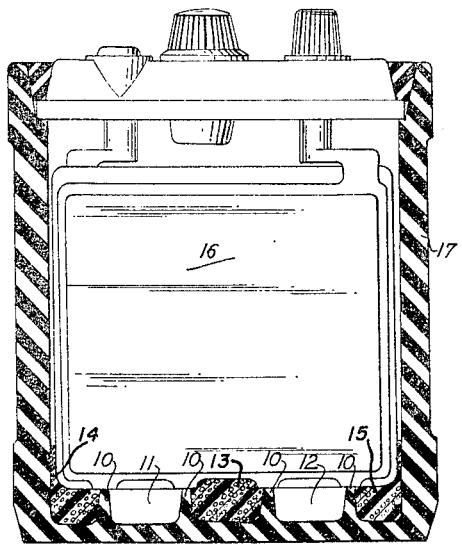

FIGURE 3 represents a further variation of this invention. In this case spaces 13, 14 and 15 have been filled with foamed resin leaving spaces 11 and 12 for the reception of sludge. Note that the foamed resin has penetrated some distance into the space between the side of the battery element 16 and case 17.

I claim as my invention:

1. The process of manufacturing a storage battery comprising supporting a battery element above the bottom of a battery case, placing a measured thin layer of a foamable, sulphuric acid resistant resin in the space between the battery element and the bottom of the battery case and then causing the resin to foam and expand and fill the space between the bottom of the battery element and the bottom of the battery case whereby the battery element is firmly secured to the battery case and is rendered resistant to vibration, the measured amount of resin being such that the bulk of the space within the battery case and not occupied by the battery element is not filled with the foamed plastic.

2. The process of manufacturing a storage battery comprising supporting a battery element above the bottom of a battery case, placing a thin, measured layer of a foamable, sulphuric acid resistant resin in the space between the battery element and the bottom of the battery case and then causing the resin to foam and expand and fill the space between the bottom of the battery element and the body of the battery case and to penetrate a substantial distance between the side of the battery element and the side of the battery whereby the battery element is firmly secured to the battery case and is rendered resistant to vibration, the measured amount of resin being such that the bulk of the space within the battery case and not occupied by the battery element is not filled with the foamed plastic.

3. The process of manufacturing a storage battery comprising supporting a battery element above the bottom of a battery case, the bottom of the battery case being divided by ribs into separate spaces, placing a thin, measured layer of a foamable, sulphuric acid resistant liquid resin in fewer than all of the spaces, and then causing the resin to foam and expand and fill the spaces in which it was placed as a liquid and contact firmly the bottom of the battery element whereby the battery element is firmly secured to the battery case and is rendered resistant to vibration, the measured amount of resin being such that the foamed plastic produced fills only the spaces in which the liquid resin was placed.

4. The process of manufacturing a storage battery comprising supporting a battery element above the bottom of a battery case, the bottom of the battery case being divided by ribs into separate spaces, placing a thin, measured layer of a foamable, sulpuric acid resistant liquid resin in fewer than all of the spaces and in at least one space adjacent the side of the battery case, and then causing the resin to foam and expand and fill the spaces in which it was placed as a liquid and contact firmly the bottom of the battery element whereby the battery element is firmly secured to the battery case and is rendered resistant to vibration, the measured amount of resin being such that the foamed plastic produced fills the spaces in which the plastic was placed and extends a small but significant distance up the sides of the battery element.

5. A storage battery comprising a battery element and a battery case, said battery element being supported above the bottom of the battery case and said battery case being provided with ribs which divide the bottom of the battery case into spaces, said battery element and said battery case being secured into a unit by a layer of foamed, sulphuric acid resistant plastic which substantially fills at least some of the spaces between the ribs in the bottom of the storage battery case, but which does not fill the bulk of the space within the battery case and not occupied by the battery element.

6. The structure recited in claim 5 in which the foamed plastic fills fewer than all of the spaces between the bottom of the battery element and the battery case.

7. The structure recited in claim 5 in which the foamed plastic extends a small but significant distance up the sides of the battery element.

References Cited by the Examiner
UNITED STATES PATENTS

| | | | |
|---|---|---|---|
| 709,157 | 9/1902 | Kennedy | 136—79 |
| 2,642,920 | 6/1953 | Simon et al. | |
| 2,895,603 | 7/1959 | Freeman. | |

WINSTON A. DOUGLAS, *Primary Examiner.*
A. SKAPARS, *Assistant Examiner.*